United States Patent [19]

Barraclough et al.

[11] 4,313,766
[45] Feb. 2, 1982

[54] PROCESS FOR THE PRODUCTION OF A PIGMENT COMPOSITION

[75] Inventors: Ronald Barraclough, Johnstone; Robert Langley, Glasgow, both of Scotland

[73] Assignee: Ciba-Geigy Corporation, Ardsley, N.Y.

[21] Appl. No.: 153,646

[22] Filed: May 27, 1980

[30] Foreign Application Priority Data

Jun. 1, 1979 [GB] United Kingdom ............... 19198/79

[51] Int. Cl.³ .................... C08K 5/34; C09B 47/04
[52] U.S. Cl. .................... 106/288 Q; 106/308 Q; 106/308 F; 106/308 N; 260/314.5; 106/308 S; 106/309
[58] Field of Search ............... 106/309, 288 Q, 308 F; 260/314.5

[56] References Cited

U.S. PATENT DOCUMENTS

| | | | |
|---|---|---|---|
| 3,523,030 | 8/1970 | Malin et al. | 106/288 Q |
| 3,891,455 | 6/1975 | Langley et al. | 106/288 Q |
| 4,088,507 | 5/1978 | Tanaka et al. | 106/288 Q |
| 4,104,276 | 8/1978 | Kranz et al. | 106/309 X |
| 4,111,650 | 9/1978 | Lacroix et al. | 260/314.5 X |
| 4,133,695 | 1/1979 | Wheeler et al. | 106/288 Q |
| 4,141,904 | 2/1979 | Cabut et al. | 106/309 X |
| 4,152,171 | 5/1979 | Barraclough et al. | 106/288 Q |
| 4,196,016 | 4/1980 | Simon | 106/309 |

FOREIGN PATENT DOCUMENTS 1140836 of 1969 United Kingdom.
1465972 3/1977 United Kingdom.

Primary Examiner—Helen M. McCarthy
Attorney, Agent, or Firm—Harry Falber

[57] ABSTRACT

A process for the production of a pigment composition useful in pigmenting surface coating comprising:
(a) milling a crude copper phthalocyanine blue pigment in the presence of 0–50% (by weight of milled materia) of a salt; and
(b) subsequently treating the milled material with a polar aliphatic solvent; whereby
(c) 8 to 12% by weight, based on crude pigment, of a copper phthalocyanine additive of the formula I

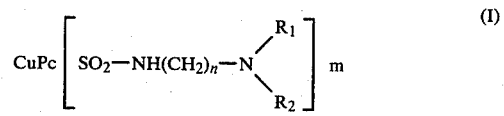

wherein CuPc is the residue of copper phthalocyanine, m and n are each an integer of from 1 to 4, and $R_1$ and $R_2$ are each an optionally substituted alkyl group, or $R_1$ and $R_2$, together with the N atom to which they are bonded, form a heterocycle, is added to the crude milled pigment prior to, during or after the solvent treatment of step (b); and, (d) the pigment composition is then isolated.

8 Claims, No Drawings

PROCESS FOR THE PRODUCTION OF A PIGMENT COMPOSITION

The present invention relates to a process for the manufacture of copper phthalocyanine blue pigment compositions.

Processes for the manufacture of phthalocyanine pigment compositions have been proposed in the past involving solvent treatment and the addition of phthalocyanine sulphonamides to crude phthalocyanine pigments.

In British Pat. No. 1,140,836 there has been described a process for the treatment of a metal phthalocyanine blue pigment comprising mixing the pigment, in dry pigmentary form, with a polar aliphatic solvent which is at least partially water-miscible; and separating the solvent from the treated pigment. By this treatment, the properties of the pigment, e.g. its strength or brightness, can be improved.

Subsequently, in British Pat. No. 1,465,972, there was described a process for the manufacture of a phthalocyanine pigment composition, having improved strength and brightness, by milling an aqueous suspension of a phthalocyanine pigment and a phthalocyanine sulphonamide containing basic groups, in the presence of an acid and a particulate grinding aid; and then removing the grinding aid.

More recently, in German Offenlegungsschrift 2554252, there has been described a process in which crude copper phthalocyanine is converted into pigment form by treating copper phthaocyanine (particle size less than 0.1 micron and produced by ball-milling crude copper phthalocyanine, preferably in the absence of auxiliaries), in organic-, or aqueousorganic-phase, with heating. The milled material is added to the said medium in the presence of 0.5 to 7 weight % of a specified basic copper phthalocyanine, and the mixture is held at a temperature within the range of from room temperature to 180° C., until optimal colour strength is achieved.

Surprisingly, we have now found that by combining some aspects of these prior disclosures whilst modifying other aspects of these disclosures, a multi-stage process has been developed which provides pigments having an unexpectedly high level of pigment properties.

According to the present invention, there is provided a process for the production of an improved pigment composition comprising:

(a) milling a crude copper phthalocyanine blue pigment in the presence of 0-50%, by weight of milled material, of a salt; and
(b) subsequently treating the milled material with a polar aliphatic solvent; whereby
(c) 8 to 12% by weight, based on crude pigment, of a copper phthalocyanine additive of the general formula I

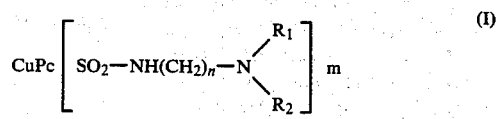

$$\left[ CuPc \left[ SO_2-NH(CH_2)_n-N \begin{matrix} R_1 \\ R_2 \end{matrix} \right]_m \right] \quad (I)$$

wherein CuPc is the residue of copper phthalocyanine, m and n are each an integer of from 1 to 4, and $R_1$ and $R_2$ are each an optionally substituted alkyl group, or $R_1$ and $R_2$, together with the N atom to which they are bonded, form a heterocycle, is added to the crude milled pigment prior to, during or after the solvent treatment of step (b); and, (d) the pigment composition is then isolated.

The crude copper phthalocyanine pigment used as starting material in the new process optionally contains up to 6% of chlorine. The pigments starting material may be essentially 100% in the beta or in the alpha crystalline form, or pigment starting materials comprising any mixture of beta and alpha forms may be used. Other suitable pigment starting materials are the ε- and γ-phthalocyanine pigments described in our British Pat. Nos. 1,544,695 and 1,546,950.

The solvent treatment stage of the invention is advantageously carried out in the presence of 0.5 to 16 parts by weight, and preferably 0.5 to 4.0 parts by weight, based on the weight of copper phthalocyanine additive of the general formula I, of an organic acid, preferably an aliphatic carboxylic acid having 1 to 10 C atoms, especially acetic acid. The presence of the acid is advantageous in that it causes the dissolution of the copper phthalocyanine additive.

The isolation of the pigment composition is preferably carried out by the addition to the mixture obtained after removal of the solvent, of an amount of a base sufficient to give a pH of from 6–12, preferably 8 to 9; and subsequently isolating the pigment by filtration and drying.

Although the milling can be carried out in the complete absence of salt, small amounts of salt can be present without having a detrimental effect on the process or final pigmentary properties. The amount of salt which can be tolerated will depend upon the nature of the salt and the process in which it is present.

Normally the milling is carried out in the presence of 0 to 50%, preferably less than 40%, based on weight of the milled material, of a salt such as anhydrous calcium chloride, anhydrous sodium acetate or anhydrous sodium sulphate.

A chlorine free or chlorine containing crude copper phthalocyanine may be used for the preparation of the pigment. When a chlorine free crude copper phthalocyanine is used, the pigment produced is in the beta form and when a chlorine containing crude copper phthalocyanine is used the pigment produced is either partially or completely in the alpha form.

The dry milling is carried out either in the complete absence of liquids or in an amount of liquid small enough to ensure that the pigment retains the characteristics of a dry powder. The milling may be carried out in apparatus such as a ball mill, vibrating mill or other comminution equipment.

If desired, the milling may be carried out in the presence of a component which may act as a milling aid to improve the efficiency of the solvent treatment stage of the process or the performance of the final product. The amount of optional component used in the milling may conveniently be up to 20% by weight, based on the weight of pigment. While it is possible to use amounts greater than 20%, no advantage is obtained in doing so and the amount used is preferably from 5% to 15% by weight, based on the weight of pigment. Examples of suitable components are phthalimide, phthalic anhydride, hydrogenated wood rosin or glyceryl mono oleate.

A small amount of a liquid amine may also be used as a milling aid, for example, a mono-, di- or tri-amine and may be aliphatic, cycloaliphatic, heterocyclic or aromatic and examples of suitable amines are aniline, ortho-toluidine, diethylaniline, dimethylaniline, n-butylamine and an aliphatic diamine such as one having the formula:

RNH.CH$_2$CH$_2$CH$_2$.NH$_2$ wherein R is the tallow derivative. The amount of liquid amine may conveniently be from 0% to 10% and preferably from 0.5% to 5% by weight based on the weight of pigment.

The polar aliphatic solvent with which the pigment composition is treated is one which is at least partially miscible with water. Suitable solvents are described in British Pat. No. 1,140,836 and include alkanols having from 1 to 4 carbon atoms in the alkyl chain, for example, methanol, ethanol, n-propanol, isopropanol and n-butanol; alkyl monocarboxylates having from 1 to 4 carbon atoms in the alkyl chain, for example alkyl esters of alkanoic acids especially ethyl acetate; dialkyl ketones having from 1 to 4 carbon atoms in each alkyl chain, for instance acetone, methyl ethyl ketone or diethyl ketone; alkoxy alkanols having from 1 to 4 carbon atoms in each of the alkyl chains of the alkoxy and alkanol components for instance, 2-methoxy ethanol or 2-ethoxyethanol; or alkylene glycols having from 2 to 6 carbon atoms in the alkylene chain, for example, ethylene glycol or diethylene glycol.

The solvent may, if desired, contain dissolved water in a proportion insufficient to cause separation into two phases, and may thus be, for example, aqueous ethanol (for instance industrial methylated spirits), an azeotropic mixture of ethanol and water or an azeotropic mixture of isopropanol and water, the alkanol in each case being the major constituent.

The solvent treatment of the pigment, as noted in U.S. Pat. No. 1,140,836, may be effected under a wide variety of conditions, the particular temperature and pressure at which the treatment is effected and the time during which the pigment and solvent are contacted, being dependent on the nature of the pigment and of the solvent in order to secure the optimum improvement in pigmentary properties.

Although the pigment is preferably contacted with the solvent at a temperature in the range of from 10° C. to the boiling point of the solvent at the pressure applied, a temperature of from 50° C. to the boiling point is particularly preferred when the treatment is carried out at atmospheric pressure. Although a superatmospheric pressure may be applied, if desired, for example when the solvent used is highly volatile at the treatment temperature chosen, it is generally convenient to treat the pigment with the solvent at atmospheric or substantially atmospheric pressure.

The proportion of solvent with which the pigment is treated in the present process, relative to the pigment, is preferably in the range of from 0.5 to 20 parts by weight of pigment, the proportion of 1 to 15, and especially 5 to 10 parts by weight of solvent, per part by weight of pigment, being particularly preferred.

The copper phthalocyanine additive of the formula I may be added at any stage of the present process prior to, during, or after this solvent treatment in step (b); but it is preferred that the pigment and derivative are contacted for at least 10 minutes at the reflux temperature of the preferred solvent, i.e. isopropanol or the water isopropanol azeotrope mixture.

The process of the invention may, for example, be carried out by mixing the chosen solvent with any organic acid and the compound of the formula I; then adding the crude milled copper phthalocyanine blue pigment; and then refluxing the resulting mixture for 0–4, preferably 0 to 2 hours.

The pigment compositon may be separated from the solvent, preferably after dilution with water in the case of volatile solvents, by distilling off of the solvent. The essentially aqueous dispersion of the pigment thus remaining is then treated with a base such as an alkal- or alkaline earth metal hydroxide,-oxide or-carbonate or a nitrogen-containing base. Examples of suitable bases are, for example, aqueous potassium hydroxide, aqueous sodium hydroxide and ammonia (liquor or gas). The quantity of base added is preferably sufficient to give pigment dispersion having a pH of 6–12, preferably 8 to 9. The resulting suspension may then be filtered, washed and dried in the usual manner.

The copper phthalocyanine additive of the formula I is known and may be prepared by the reaction of a copper phthalocyanine derivative containing 1–4 chlorosulphonic acid groups with an amine of the formula:

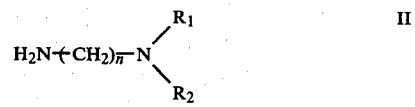

II wherein R$_1$ and R$_2$ and n have their previous significance.

Examples of amines of formula II include N,N-dimethylaminomethylamine, N,N-diethylaminomethylamine, N,N-dibutylaminomethylamine, N,N-dimethylaminoethylamine, N,N-diethylaminoethylamine, N,N-dipropylamino-ethylamine, N,N-diethylaminopropylamine, N,N-dipropylaminopropylamine, N,N-dibutylaminopropylamine, N,N-dimethylaminobutylamine, N,N-diethylaminobutylamine, N,N-dipropylaminobutylamine, N,N-dibutylaminobutylamine, N-aminopropylmorpholine, N-aminoethylpiperidine, N-aminoethylpyrrolidine, N-aminopropylpipecoline and, especially, N,N-dimethylaminopropylamine.

A preferred embodiment of the invention concerns a process for the manufacture of a pigment composition which comprises treating a crude copper phthalocyanine blue pigment obtained by:

(a) milling this pigment with 0 to 40%, by weight of milled material, of a salt;

(b) subsequently treating the milled pigment with a polar aliphatic solvent in the presence of an organic acid;

(c) adding 8 to 12% by weight, based on crude pigment, of copper phthalocyanine additive of the formula I, as hereinbefore defined, especially CuPc[SO$_2$NH—(CH$_2$)$_3$—N(CH$_3$)$_2$]$_3$ to the crude milled pigment prior to, or during solvent treatment;

(d) subsequently removing the solvent from the mixture obtained after solvent treatment; and (e) adding sufficient quantity of a base to the aqueous pigment dispersion to bring the pH to between 8 and 9.

The invention also relates to pigment compositions whenever prepared by the process of the invention.

The pigment compositions obtained according to the invention are useful for pigmenting various media in particular inks and especially decorative and industrial paints.

The invention is illustrated by the following Examples in which parts and percentages are expressed by weight unless otherwise stated. Parts by weight bear the same relationship to parts by volume as do kilograms to liters. Examples A to E illustrate comparative compositions falling outside the present invention.

EXAMPLE 1

340 mls of isopropanol, (containing approximately 12% of water), 11.4 g of glacial acetic acid and 5.7 g of a compound of the formula

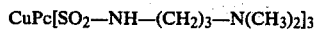

CuPc[SO$_2$—NH—(CH$_2$)$_3$—N(CH$_3$)$_2$]$_3$ were stirred for 30 minutes at room temperature.

To this mixture were added 85 g of milled material consisting of 57 g of crude copper phthalocyanine blue containing ca 2% chlorine, and 28 g anhydrous CaCl$_2$. Milling was carried out for 6 hours.

This mixture was stirred for 30 minutes at room temperature and refluxed for 2 hours.

250 mls of water were then added and the solvent distilled off, the end point of the distillation being achieved when the isopropanol had been removed. Upon cooling to room temperature (<25° C.), 25% aqueous NaOH was added until a pH of 8.5 to 9 was achieved.

The mixture was stirred for 30 minutes at room temperature filtered and washed and the resulting α CuPc pigment composition was dried at 60° C.

The pigment exhibits very good strength and brightness together with excellent flow properties and flocculation resistance in decorative and industrial paint systems.

EXAMPLE A

To 340 mls of isopropanol (containing approximately 12% water) was added:
85 g of milled material consisting of
57 g of crude copper phthalocyanine blue containing ca 2% chlorine, and
28 g anhydrous calcium chloride (33% salt, based on weight of milled material).

Milling was carried out for approximately 6 hours using a laboratory vibratory mill. This mixture was stirred for 30 minutes at room temperature and then refluxed for 2 hours. 250 mls of water were then added and the solvent distilled off. The pigment was isolated by filtration, washed until neutral and chloride free and dried at 50°-60° C. The pigment was characterised by the α-crystal configuration. The pigment exhibited good strength and brightness but very poor flocculation resistance in decorative and industrial paint formulations compared to Example 1. Rheological properties were also inferior.

EXAMPLE B 600 mls of isopropanol (containing approximately 12% water),
4.4 gms of glacial acetic acid and 2.2 gms of a compound of the formula CuPc[SO$_2$NH (CH$_2$)$_3$—N(CH$_3$)$_2$]$_3$ were stirred for 30 minutes at room temperature. To this mixture were added 85 g. of milled material consisting of 21.25 gms of crude copper phthalocyanine blue containing
ca. 2% chlorine, and
63.75 gms anhydrous calcium chloride.

Milling was carried out for 6 hours. This mixture was stirred for 30 minutes at room temperature and then refluxed for 2 hours. 500 mls of water were then added and the solvent distilled off. Upon cooling to room temperature (<25° C.), 25% aqueous NaOH was added until a pH of 8.5 to 9.0 was achieved. The mixture was stirred for 30 minutes at room temperature, filtered, washed neutral and chloride free and then dried at 50°-60° C.

The α-copper phthalocyanine pigment exhibited inferior strength, flocculation resistance and flow properties compared to Example 1.

EXAMPLE C 85 gms of milled material (milled for 6 hours) consisting of 57 gms of crude copper phthalocyanine blue containing approximately 2% chlorine, and 28 gms anhydrous calcium chloride, were added to:
500 mls Water
11.4 gms Glacial Acetic Acid
5.7 CuPc(SO$_2$NH(CH$_2$)$_3$N(CH$_3$)$_2$)$_3$ The mixture was stirred for 30 minutes at room temperature and then stirred at 90°-95° C. for 1 hour. After cooling to room temperature, sufficient 25% aqueous NaOH was added to give a pH of 8.5-9.0. The suspension was stirred at room temperature for 30 minutes and then filtered, washed neutral and chloride free and then dried at 50°-60° C.

The α-pigment exhibited inferior strength brightness flocculation resistance and rheological properties when compared to Example 1 in decorative and industrial paint formulations.

EXAMPLE D

The procedure of Example 1 was repeated, except that the alkali treatment stage was omitted.

The resulting α-pigment gave inferior strength and brightness but similar rheological properties and flocculation resistance to Example 1.

EXAMPLE E

The procedure of Example 1 was repeated except that
2.85 gms of CuPc [SO$_2$NH(CH$_2$)$_3$N(CH$_3$)$_2$]$_3$ and
5.7 gms Glacial Acetic Acid were used, corresponding to 5% of additive on weight of pigment.

The α-pigment exhibited inferior colouristic properties when compared to Example 1.

EXAMPLE 2

A pigment composition is obtained by following the procedure described in Example 1 but with the omission of anhydrous CaCl$_2$ during milling.

EXAMPLE 3

A pigment composition is obtained by following the procedure described in Example 1 but refluxing for ½ hour instead of 2 hours.

EXAMPLE 4

A pigment composition is obtained by following the procedure described in Example 1 but refluxing for 1 hour instead of 2 hours.

EXAMPLE 5

A pigment composition is obtained by following the procedure described in Example 1 but omitting the reflux step.

EXAMPLE 6

A pigment composition is obtained by following the procedure described in Example 1 but using aqueous ammonia (ammonium hydroxide) instead of 25% aqueous NaOH to give a pH of 8.5 to 9.

EXAMPLE 7

A pigment composition is obtained by following the procedure described in Example 1, but using ammonium hydroxide instead of 25% aqueous NaOH to give a pH of 8.5 to 9 and afterwards refluxing for 30 minutes prior to isolating the pigment.

In each of Examples 2 to 7 good results comparable with that of Example 1 were obtained.

EXAMPLE 8

To a liter flask there was added:
350 mls Methyl Ethyl Ketone
11.4 g Glacial Acetic Acid and
5.7 g of a compound of the formula,

$CuPc(SO_2NH(CH_2)_3N(CH_3)_2)_3$

The mixture was stirred for 30 minutes at room temperature before adding:
85.0 g of milled material consisting of
57.0 g of crude copper phthalocyanine blue containing
2% chlorine, and 28 g anhydrous calcium chloride.

Milling was carried out for 12 hours. This mixture was stirred for 30 minutes at room temperature prior to refluxing for 2 hours. 250 mls of water were then added and the solvent distilled off, the end point of the distillation being achieved when the solvent had been removed. After cooling to below 20° C., 25% aqueous sodium hydroxide was added until a pH of 8.5 to 9 was achieved. The mixture was stirred for 30 minutes at room temperature, filtered, washed neutral and chloride free and the resulting CuPc pigment composition dried at 60° C. The pigment is a mixture of the following crystal modifications.
40% alpha crystal form
60% beta crystal form
The pigment exhibits very good strength and brightness together with excellent flow properties and flocculation resistance in decorative and industrial paint systems.

EXAMPLE 9

The procedure of Example 8 was repeated except that the solvent used was ethyl acetate. The colouristic performance of the product was similar to that of Example 8. The pigment was a mixture of the following crystal forms:
40% alpha crystal form
60% beta crystal form.

EXAMPLE 10

The procedure of Example 8 was repeated except that the solvent used was n-butanol and the amount of water added prior to distillation was 700 mls. Colouristic results of the product were comparable to that of Example 8. The pigment was a mixture of the following crystal forms:
63% alpha crystal form
37% beta crystal form

EXAMPLE 11

The procedure of Example 8 was repeated except that 228 mls of isopropanol (containing 12% water) was used in place of the methyl ethyl ketone. The colouristic performance of the $\alpha$-CuPc pigment so produced was similar to that of Example 1.

EXAMPLE 12

The procedure of Example 11 was repeated except that the amount of isopropanol (containing 12% water) used was increased to 456 mls. Colouristic performance of the $\alpha$-CuPc pigment so obtained was similar to that of Example 1.

EXAMPLE 13

The procedure of Example 1 was repeated except that the pH was adjusted to 10 with dilute aqueous sodium hydroxide after distillation and cooling to below 20° C. Colouristic performance of the $\alpha$-CuPc pigment so produced was comparable to that of Example 1.

EXAMPLE 14

The procedure of Example 13 was repeated except that the pH was adjusted to 12. Colouristic performance of the product so produced was comparable to that of Example 1. The CuPc pigment was present in the $\alpha$-crystal modification.

EXAMPLE 15

In a procedure similar to that described in Example 1, there were used:
4.56 g of $CuPc(SO_2NH(CH_2)_3N(CH_3)_2)_3$
(8% on weight of pigment) and
9.12 mls Glacial Acetic Acid
Colouristic performance of the $\alpha$-CuPc pigment so obtained was comparable to that of Example 1.

EXAMPLE 16

In a procedure similar to that of Example 15 there were used:
6.84 g of $CuPc(SO_2NH(CH_2)_3N(CH_3)_2)_3$
(12% on weight of pigment) and
13.68 g Glacial Acetic Acid.
Colouristic performance of the $\alpha$-CuPc pigment so obtained was comparable to that of Example 1.

EXAMPLE 17

The procedure of Example 1 was repeated except that that dilute potassium hydroxide solution was used in place of sodium hydroxide. Colouristic performance of the $\alpha$-CuPc pigment so produced was comparable to that of Example 1.

EXAMPLE 18

The procedure of Example 1 was repeated but using propionic acid in place of glacial acetic acid. Colouristic performance of the $\alpha$-CuPc pigment so obtained was comparable to that of Example 1.

EXAMPLE 19

The procedure of Example 1 was repeated but replacing acetic acid with formic acid. Colouristic performance of the α-CuPc pigment so obtained was comparable to that of Example 1.

EXAMPLE 20

The procedure of Example 1 was repeated but with the following changes:
1. 450 mls ethyl acetate were used in place of isopropanol;
2. the reflux stage was omitted;
3. 350 mls of water were added prior to distillation; and
4. the pH was adjusted to 9.0 after distillation and cooling to below 20° C.

Colouristic performance of the α-CuPc pigment so obtained was comparable to that of Example 1.

EXAMPLE 21

The procedure of Example 20 was modified to include a reflux for 30 minutes prior to distillation.

Colouristic performance of the α-CuPc pigment was comparable to that of Example 1.

EXAMPLE 22

The procedure of Example 20 was modified to include a reflux for 1 hour. Colouristic performance of the α-CuPc pigment was comparable to that of Example 1.

EXAMPLE 23

The procedure of Example 20 was modified to include the following changes:
1. Use of 425 mls of methyl ethyl ketone.
2. Reflux for 30 minutes, prior to distillation. The colouristic performance of the α-CuPc pigment so produced was comparable to that of Example 1.

EXAMPLE 24

The procedure of Example 23 was modified to include a reflux for 1 hour. Colouristic performance of the α-CuPc pigment so produced was comparable to that of Example 1.

EXAMPLE 25

The following changes were effected to the procedure of Example 20.
1. Use of 350 mls n-butanol
2. Reflux for 30 minutes prior to distillation
3. Addition of 700 mls of water prior to distillation.

Colouristic performance of the α-CuPc pigment so obtained was comparable to that of Example 1.

EXAMPLE 26

The procedure of Example 25 was modified to include a reflux for 1 hour. Colouristic performance of the α-CuPc pigment so produced was comparable to that of Example 1.

EXAMPLE 27

In a procedure similar to that of Example 1, the following changes were made:
1. Use of 85 g of milled material consisting of: 57 g of crude copper phthalocyanine blue (no chlorine present);
28 g anhydrous calcium chloride
0.8 g diethylaniline; and
0.5 g glycerol mono oleate
Mill for 6-9 hours.
2. Reflux for 4 hours.

The beta-pigment so obtained exhibited very good flow properties and flocculation resistance in decorative and industrial paint systems.

EXAMPLE 28

The procedure of Example 27 was modified to add the copper phthalocyanine non-flocculating additive and the glacial acetic acid after the reflux stage but prior to distillation. Colouristic performance of the beta-pigment so obtained was similar to Example 27.

What is claimed is:
1. A process for the production of a pigment composition comprising:
    (a) milling a crude copper phthalocyanine blue pigment in the presence of 0–50%, by weight of milled material, of a salt; and
    (b) subsequently treating the milled material with from 0.5 to 20 parts by weight of the pigment in step (a) of a polar aliphatic solvent in the presence of 0.5 to 4 parts by weight of an aliphatic carboxylic acid having 1 to 10 C atoms, based on the weight of the additive in step (c); whereby
    (c) 8 to 12% by weight based on crude pigment of a non-flocculating copper phthalocyanine additive of the formula I

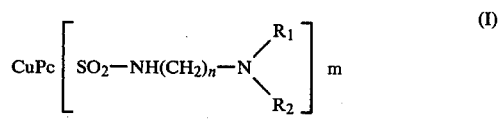

wherein CuPc is the residue of copper phthalocyanine, m and n are each an integer of from 1 to 4, and $R_1$ and $R_2$ are each an optionally substituted alkyl group, or $R_1$ and $R_2$, together with the N atom to which they are bonded, form a heterocycle, is added to the crude milled pigment prior to, during or after the solvent treatment of step (b); and, (d) by the addition to the mixture obtained after removal of the solvent, of an amount of a base sufficient to give a pH 6–12, and subsequently filtering and drying the pigment composition is then isolated.

2. A process as claimed in claim 1 wherein the crude copper phthalocyanine pigment used as starting material optionally contains up to 6% of chlorine.

3. A process as claimed in claim 1 wherein the pigment starting material is essentially 100% beta form or 100% alpha form, or a mixture of beta- and alpha forms.

4. A process as claimed in claim 1 wherein the salt is anhydrous calcium chloride, anhydrous sodium acetate or anhydrous sodium sulphate.

5. A process as claimed in claim 1 wherein the polar aliphatic solvent is an alkanol having from 1 to 4 carbon atoms in the alkyl chain; an alkyl monocarboxylate having from 1 to 4 carbon atoms in the alkyl chain; a dialkyl ketone having from 1 to 4 carbon atoms in each alkyl chain; an alkoxyalkanol having from 1 to 4 carbon atoms in the alkyl chains of each of the alkoxy and alkanol components; or an alkylene glycol having from 2 to 6 carbon atoms in the alkylene chain.

6. A process as claimed in claim 1 wherein the solvent is isopropanol or a water-isopropanol azeotrope mixture.

7. A process as claimed in claim 1 wherein stage (b) of the process is effected at a temperature within the range of from 50° C. to the boiling point of the treatment mixture when the treatment is effected at atmospheric pressure.

8. A process as claimed in claim 1 wherein the additive of formula I is CuPc [$SO_2$—NH—($CH_2$)$_3$—N($CH_3$)$_2$]$_3$.

* * * * *